Dec. 11, 1951    R. H. CLARK    2,578,287
COMBINED FORK AND SPOON
Filed Oct. 4, 1948

INVENTOR.
Robert H. Clark
BY
ATTORNEY

UNITED STATES PATENT OFFICE 2,578,287

COMBINED FORK AND SPOON

Robert H. Clark, Denver, Colo.

Application October 4, 1948, Serial No. 52,757

5 Claims. (Cl. 30—150)

This invention relates to culinary implements and more particularly to a combined spoon and fork.

In the prior art it has been common practice for the chef, housewife, or person serving food, to employ a separate spoon and fork for performing their respective functions. If a chef, for example, is performing a cooking operation which requires both the use of a spoon and fork, he must lay one down and pick up the other when it is desired to change operations. Thus, if the chef desires to stir or ladle a food of more or less liquid nature, he employs a spoon. He may, at the same time, be cooking a more solid food which requires turning, or removing from the stove, in which case he employs a fork. It is apparent, therefore, that when operations are changed, one to the other, he must necessarily lay down one implement and pick up the other. This, obviously, results in inconvenience and loss of time.

Similarly, persons serving food from a steam table, or the like, are constantly picking up and laying down the fork and spoon as they serve different kinds of food.

The principal object of the invention, therefore, is to provide a combined implement which facilitates handling of food during the process of cooking, or serving same.

Another object is to provide a spoon and fork secured to a single handle in a novel relationship such that the combined implement serves a similar purpose of a separate spoon and fork, but more expeditiously.

Another object is to so relate the spoon and fork that either is optionally useable or both may be used together.

A still further object is to provide a combined spoon and fork which may be manufactured more economically than two separate implements and also is more efficient than two separate implements.

Still further objects, advantages, and salient features will become more apparent from a consideration of the description to follow, the appended claims, and the accompanying drawing, in which:

Figure 1:
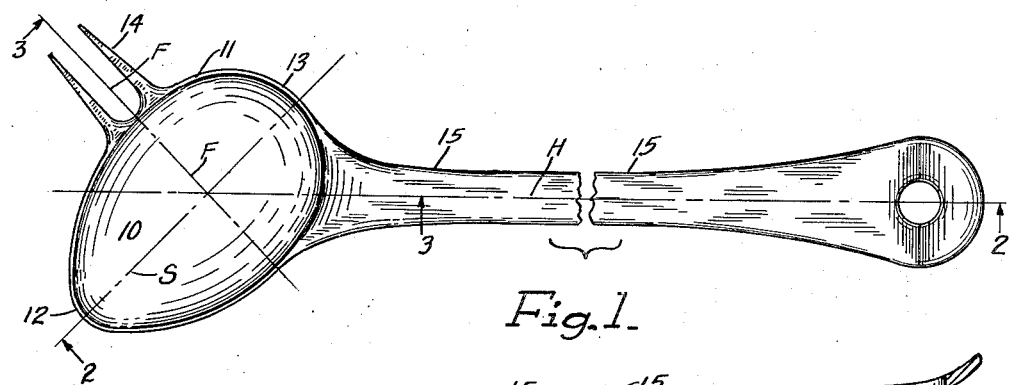
Figure 1 is a plan view of a preferred embodiment of the invention, shown somewhat foreshortened by breaking the handle.
Figure 2:
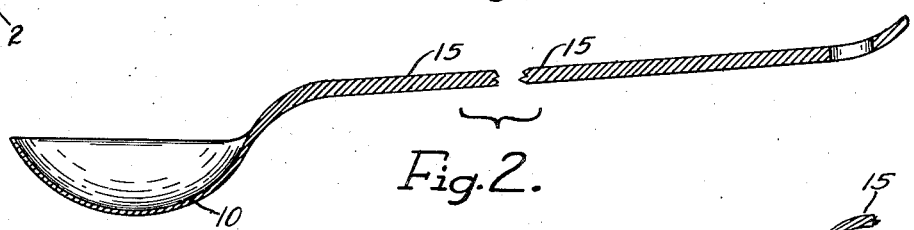
Figure 2 is a section taken on line 2—2, Figure 1.
Figure 3:
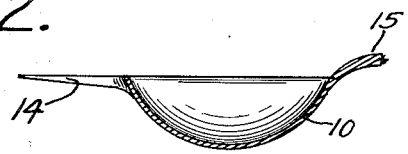
Figure 3 is a section taken on line 3—3, Figure 1.

Referring in detail to the drawing, there is shown in Figure 1, a spoon 10 which may have any desired peripheral configuration and cross section, such as shown, which is characteristic of large serving or cooking spoons now in use. Along one side 11 of the spoon between the tip 12 and heel 13, a plurality of fork tines 14 are provided projecting from the side of the spoon. A handle 15 is connected to the other side of the spoon at a point of symmetry corresponding to the position of the tines. The longitudinal axis of the handle is indicated at H, the axis of the fork at F, and the longitudinal axis of the spoon at S. It will be observed that axes F and S intersect at a point on the spoon and diverge in opposite directions from axis H at substantially the same angle. As shown, this angle of divergence is 45 degrees, thus placing axes S and F 90 degrees to each other.

Figure 5:
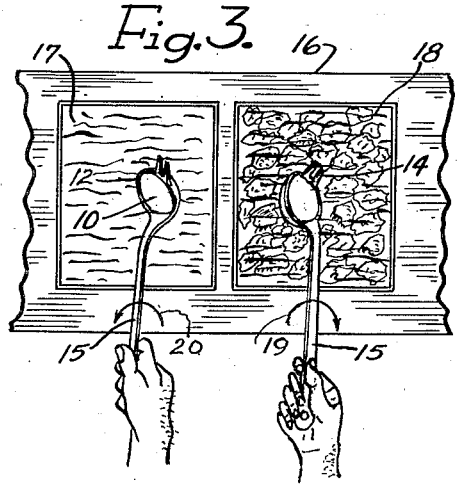
Figure 5 is a plan view showing the invention in use.

In Figure 5 is shown by way of exemplification, one manner in which the spoon is used. A steam table 16, may, for example, have a tray 17 of gravy thereon and a tray of potatoes or other solid food adjacent thereto. The gravy is best served with a spoon and the potatoes with a fork. The food server rotates handle 15 to the right as shown by arrow 19 and picks up a potato depositing it on the customer's dish. The server then rotates the handle to the left as shown by arrow 20 and ladles up some gravy depositing the latter on the potato. Only a slight twist of the wrist is required to place either the fork or spoon in its operative position and it thus becomes apparent that by eliminating the former procedure of using two separate implements, the food server may more efficiently and expeditiously perform the same operations.

As another example, a chef may be performing a cooking operation which requires turning or handling of a solid food such as meat and perhaps basting of same, formerly requiring both a spoon and fork. With this invention, he may perform both operations with the same implement.

On occasions, the fork and spoon will each perform its respective function simultaneously. For example, certain foods may be part liquid and part solids, such as spaghetti which is in a sauce. If a fork alone were used to pick up the spaghetti, no appreciable amount of sauce would be picked up. If a spoon alone were used, the spoon could retain some sauce, but it is difficult to retain spaghetti on a spoon. With this invention when the combined implement is inserted into such a mixture, the fork will more expeditiously gather and hold the spaghetti and the spoon hold the sauce, each implement performing the individual function for which it is best adapted.

Another example is in serving stew. There may be a chunk of meat or a vegetable in the stew which could be more expeditiously picked up with a fork than with a spoon. The food server may engage such solid food with the fork and at the same time retain the liquid sauce in the spoon. As another example, it is sometimes desirable to insert a fork underneath a portion of solid food, such as a flat piece of meat either to loosen it from the pan after sticking, or to insert a spatula or the like thereunder to remove it from the pan. With this device the fork tines may be used as usual and further motion will dispose the spoon beneath the food. The large surface of the spoon thus serves a purpose similar to the spatula and the fork tines operate to guide the food onto the top of the spoon.

Figure 4:
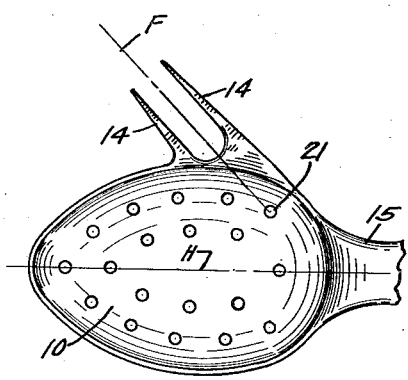
Figure 4 is a fragmentary plan view of a modified form of the invention.

In Figure 4, I have shown a modification wherein the axis of the spoon lies along the axis of the handle and the fork axis is at an angle to the handle axis as in Figure 1. With this embodiment the fork would be used as previously described but the spoon would enter the liquid along its side rather than the tip. If it were desired to use the tip, however, this is also possible by placing the handle at the desired angle and presenting the tip of the spoon to the food rather than the side thereof.

In Figure 4 perforations 21 are also shown in the spoon. This type of construction is desirable with certain types of solid foods, which are submerged in liquid but where it is not desired to ladle up the liquid. Thus, if it be desired to serve peas, spinach, etc., a portion of the solid food is engaged by the spoon and the liquid in which the food is cooked drains through the perforations 21. This perforated construction could obviously be employed with the spoon of Figure 1, hence it is to be understood that "spoon" is to be given its broadest meaning and is not necessarily limited to an imperforate spoon.

While the angle of the fork axis and spoon axis to the handle axis has been described as 45 degrees, it is to be understood that these angles need not necessarily be identical, nor need they be exactly 45 degrees. Any suitable angle could be employed within the spirit of invention.

The implement may be made in various sizes, the larger of which would be used in restaurants and the like, and the smaller by the housewife. The implement where used for cooking purposes would, normally, be made of metal such as stainless steel or plated steel; although it is to be understood that other material may be employed, if desired.

It will also be apparent that the relationship of the spoon and handle need not be exactly as shown. In the embodiment of Figure 1, for example, the three axes need not necessarily intersect. The handle could be connected to the heel of the spoon as shown in Figure 4 still retaining the spoon angularly related thereto, or could be connected to the spoon intermediate the position shown and the heel. While two fork tines are shown, this number may be varied as desired and the position of the tines may also be varied so long as they perform in a manner consonant with the spirit of the invention.

Having described the invention what is claimed as new is:

1. A culinary implement adapted to be manipulated to different positions by rotation of the wrist of the user, comprising; a spoon having a peripheral continuously smoothly curved side edge, an elongated handle connected at one end thereof to a rearward portion of the spoon, the longitudinal axis of the spoon extending in a direction to form an obtuse angle with the longitudinal axis of the handle, whereby the tip of the spoon may be presented to food by rotation of the wrist in one direction, a plurality of individual fork tines formed integral with the spoon projecting from a portion of said continuously smoothly curved side edge, the inner end of each tine being directly connected to said side edge to provide a space between adjacent tines, the inner end of said space being adjacent said side edge, the tines projecting substantially the same distance from said side edge, the longitudinal axis of said tines extending in a direction to form another obtuse angle with the longitudinal axis of the handle substantially the same as the first named obtuse angle whereby rotation of the wrist in a direction opposite to the aforementioned direction of rotation will present the ends of the tines to food.

2. A culinary implement comprising; a spoon having a peripheral continuously smoothly curved side edge, an elongated handle connected at one end thereof to a portion of said edge, a plurality of individual fork tines projecting from another portion of said edge, the inner end of each tine being directly connected to said edge to provide a space between adjacent tines, the inner end of said space being adjacent said edge, the tines projecting to a plane substantially perpendicular to a longitudinal axis between the tines, said longitudinal axis and the axis of the spoon, respectively, forming a divergent angle to the longitudinal axis of the handle.

3. A culinary implement in accordance with claim 2 wherein the axis of the tines and spoon, respectively, are each angularly disposed with respect to the longitudinal axis of the handle.

4. A culinary implement in accordance with claim 3 wherein the axis of the tines and spoon, respectively, diverge from the longitudinal axis of the spoon at substantially the same angle.

5. A culinary implement in accordance with claim 4 wherein said same angle is substantially 90°.

ROBERT H. CLARK.

REFERENCES CITED

The following references are of record in the file of this patent:

UNITED STATES PATENTS

| Number | Name | Date |
| --- | --- | --- |
| D. 84,647 | Pellow | July 14, 1931 |
| 431,914 | Plotts | July 8, 1930 |

FOREIGN PATENTS

| Number | Country | Date |
| --- | --- | --- |
| 203,384 | Great Britain | Sept. 6, 1923 |